United States Patent [19]

Henle et al.

[11] 4,046,023
[45] Sept. 6, 1977

[54] ADJUSTING MECHANISM FOR TRANSMISSION BAND TENSIONER

[75] Inventors: Richard G. Henle, Lafayette Hill; Clifton S. Merkert, Springfield; David C. Thomas, Jenkintown, all of Pa.

[73] Assignee: FMC Corporation, San Jose, Calif.

[21] Appl. No.: 728,577

[22] Filed: Oct. 1, 1976

Related U.S. Application Data

[63] Continuation-in-part of Ser. No. 674,002, April 5, 1976.

[51] Int. Cl.² .......................... F16H 7/08; F16H 55/52
[52] U.S. Cl. ........................... 74/242.8; 74/230.17 A
[58] Field of Search ............... 74/242.8, 242.15 R, 74/230.17 A, 230.17 M

[56] References Cited

U.S. PATENT DOCUMENTS

| | | | |
|---|---|---|---|
| 3,097,540 | 7/1963 | Berens | 74/230.17 A |
| 3,136,169 | 6/1964 | Kärger et al. | 74/230.17 A |
| 3,138,033 | 6/1964 | Glasson et al. | 74/230.17 A |
| 3,490,301 | 1/1970 | Steur | 74/230.17 A |
| 3,561,279 | 2/1971 | Beneke | 74/230.17 A X |
| 3,837,234 | 9/1974 | Wu et al. | 74/230.17 A X |
| 3,916,705 | 11/1975 | Smith et al. | 74/230.17 A |

Primary Examiner—Leonard H. Gerin
Attorney, Agent, or Firm—J. F. Verhoeven; C. E. Tripp

[57] ABSTRACT

A transmission, in which power is transmitted from one variable diameter pulley to another through an endless band, has an automatic band tensioning mechanism. The band tensioning mechanism includes a tensioning shaft, an adjusting wheel rotatably mounted on the shaft, and a spring connected between the shaft and the wheel. A worm engaged with the wheel is mounted on a shaft slidably received in a locking member. The worm has a locking shoulder at one end which is normally urged, by the spring acting through the wheel, into engagement with a locking shoulder on one end of the locking member. The worm is moved out of locking engagement against the bias of the spring for rotation of the worm and wheel, and tightening of the spring.

6 Claims, 7 Drawing Figures

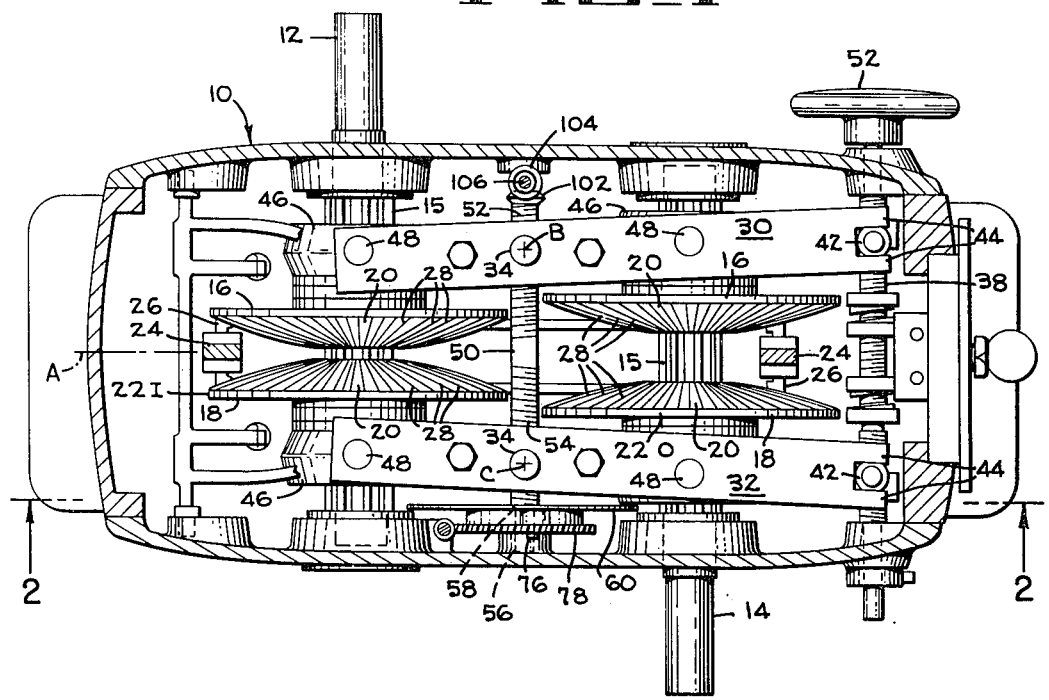
FIG_1
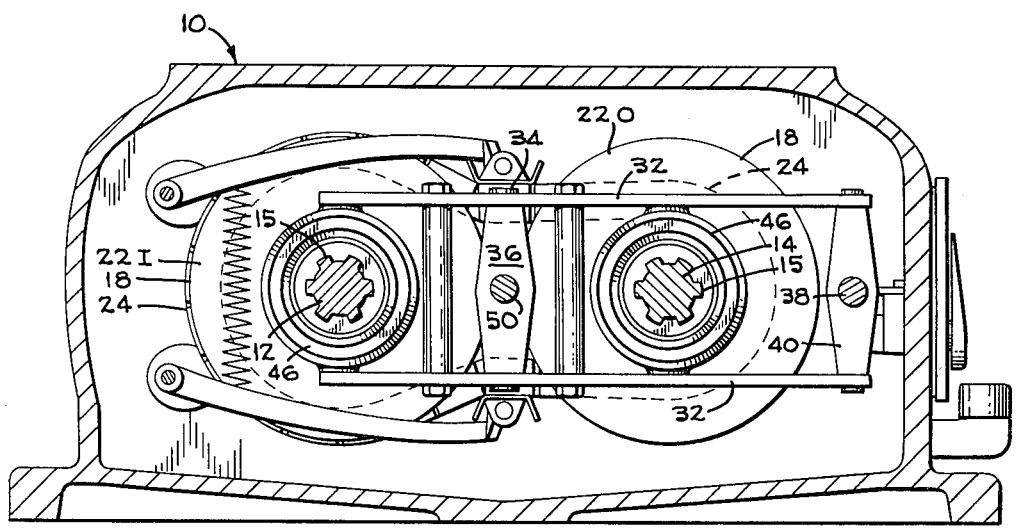
FIG_2

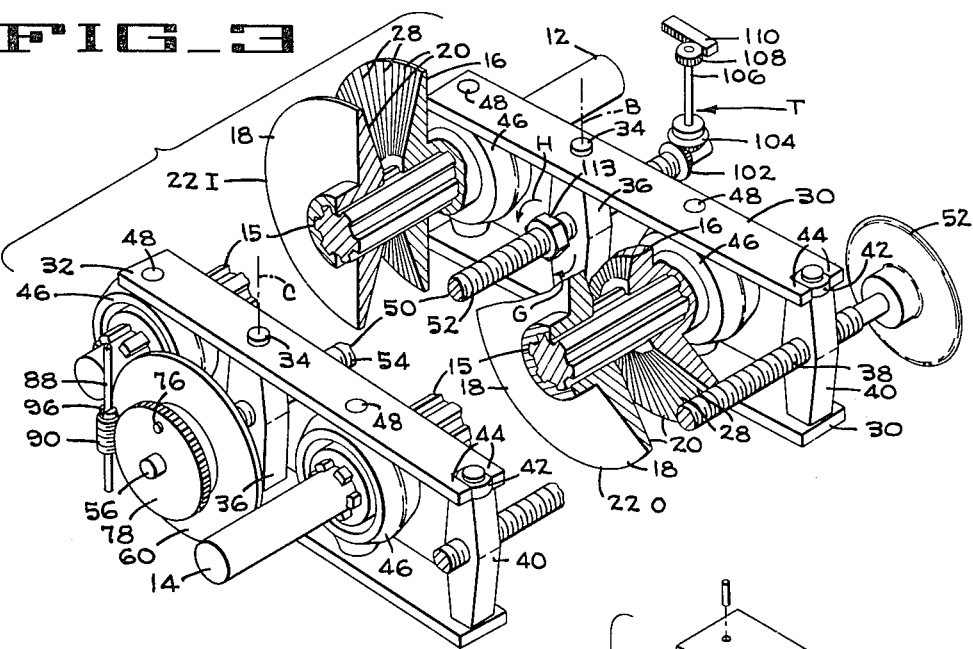

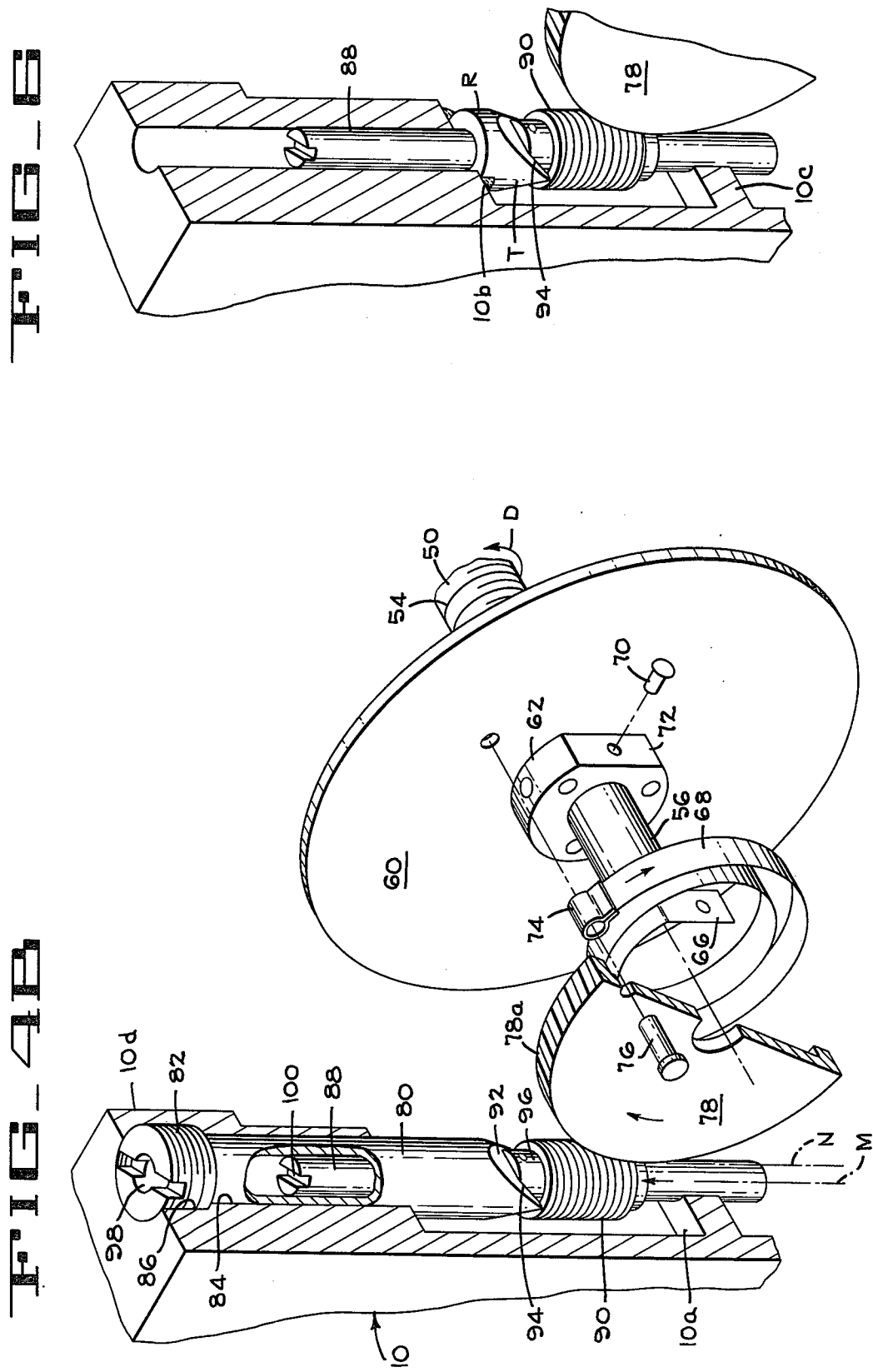

ADJUSTING MECHANISM FOR TRANSMISSION BAND TENSIONER

This application is a continuation-in-part of a United States patent application Ser. No. 674,002 filed Apr. 5, 1976.

BACKGROUND OF THE INVENTION

1. Field of the Invention

The present invention relates to transmissions of the type wherein an input shaft is connected to an output shaft by an endless band received over adjustable pulleys on said shafts. More specifically, the present invention relates to adjustment of tension applied to the endless band.

2. Description of the Prior Art

A well-known form of transmission has parallel input and output shafts on each of which is mounted, in non-rotating relation, a pulley with conical sidewalls shiftable toward and from each other. An endless band, which may be a belt or chain, is received over the adjustable pulleys to transmit torque from the input shaft to the output shaft. In order to change the speed ratio between the input shaft and the output shaft, the effective diameters of both pulleys is changed, one increasing in diameter and the other simultaneously decreasing in diameter, since the endless band is of fixed length. This is usually done by means of two levers, one engaged with one side of each of the pulleys and one engaged with the other side of the pulleys. The levers pivot about a fulcrum located between the two pulleys, and the pulleys are swung about their fulcrums to change the speed ratio between the input and the output shaft. A band tensioning shaft, extending parallel to the input shaft and output shaft and between the shafts is frequently provided. Fulcrum blocks, or members, are threadedly engaged with the shaft (which has threads of opposite hands at opposite ends of the shaft) to define the fulcrums for the levers. Rotation of the shaft in one direction will draw the sides of both pulleys together to simultaneously increase their diameters, and thus tighten, or increase the tension in, the band. Transmissions of this type are shown in U.S. Pat. Nos. 2,112,157; 2,266,687; 3,097,540; 3,136,169; 3,138,033; 3,190,136; 3,349,633; 3,490,301; 3,750,487; and 3,916,705.

All of the above noted patents have automatic band tightening, or tensioning, mechanisms to increase the diameters of both pulleys simultaneously as wear occurs in the band, thereby maintaining the desired tension in the band. Sometimes the automatic tightening is effected by a coil spring engaged with the band tensioning shaft as shown in U.S. Pat. Nos. 2,112,157; 3,136,169; 3,750,487; and 3,916,705.

If a coil spring has one end connected to the band tensioning shaft to bias the shaft in a tightening direction, it is necessary to anchor the opposite end of the coil spring. At the same time, it is desirable to release the other end of the coil spring for adjustment and for resetting the mechanism when a new band is installed. The mechanism of U.S. Pat. No. 3,916,705 includes a bevel gear wheel rotatably mounted on the shaft, and a winding gear engaged with said bevel gear wheel. The shaft on which the winding gear is mounted extends outside the transmission housing and can alternatively be manually rotated or locked in a fixed position.

SUMMARY OF THE INVENTION

In the present invention, mechanism is provided which anchors the end of the coil spring remote from the tensioning shaft, but yet permits instant release of that end for tightening the spring. After the spring has been tightened to a desired tautness, the spring end is automatically locked to retain the potential energy supplied thereto by the tightening.

As in U.S. Pat. No. 3,916,705, there has been provided an adjusting gear wheel coaxial with the tensioning shaft, and a coil spring connected between the tensioning shaft and the adjusting wheel. In the present invention, however, a worm, which is continuously engaged with the adjusting gear wheel, is provided and forms a part of a worm unit. The worm unit includes a shaft received in a locking member which may be in the form of a ring or sleeve. The worm unit has a locking shoulder in facing relation to a locking shoulder on the locking ring or sleeve. The worm unit is normally biased into locking engagement with the locking ring or sleeve by the coil spring acting through the adjusting wheel which is rotatable relative to the tensioning shaft. The worm unit, however, can be shifted (for example, manually, as by a screwdriver) out of locking engagement with the locking ring or sleeve and turned to tighten (or loosen) the spring. When the worm unit is released, it automatically springs back into locking engagement with the locking ring or sleeve to anchor the end of the spring remote from the tensioning shaft, thereby retaining the potential energy stored in the spring. Thus, the tensioning screw is continuously biased to tighten the endless drive band as wear occurs.

It is therefore one object of the present invention to provide an easily releasable mechanism to anchor one end of a tensioning shaft spring.

It is another object of the present invention to provide a releasable mechanism for anchoring one end of the tensioning shaft spring which automatically relocks after tension in the spring has been adjusted.

BRIEF DESCRIPTION OF THE DRAWINGS

FIG. 1 is a plan view of a transmission, with the top of the housing cut away, incorporating the mechanism of the present invention.

FIG. 2 is a view taken on the line 2—2 of FIG. 1.

FIG. 3 is a fragmentary view, in perspective, of the mechanism of FIGS. 1 and 2.

FIG. 4A is an enlarged exploded view in perspective of the spring holding and adjusting mechanism, with the worm unit shifted by a screwdriver out of engagement with the locking member against the bias of the tension shaft spring.

FIG. 4B is a view similar to FIG. 4A except with the worm unit held in its normal locking position, by the tension shaft coil spring, in engagement with the locking member.

FIG. 5 is a view, with parts broken away, of a band wear indicating mechanism.

FIG. 6 is a view similar to FIG. 4B but showing a modified form of the invention.

DESCRIPTION OF THE PREFERRED EMBODIMENTS

The speed reducer in which the present invention is embodied is a conventional reducer of the general type shown, for example, in the U.S. Pat. No. 2,266,687. A typical conventional reducer may have a housing 10, with a longitudinal centerline A, and two transverse drive shafts 12 and 14 journaled in the housing. One of the transverse drive shafts, such as 12, may be considered the input shaft and the other shaft 14 the output shaft, but it should be understood that either of the transverse shafts 12, 14 can function as an input shaft and the other as the output shaft.

In order to transmit motion between the input shaft 12 and the output shaft 14, each shaft has a splined portion 15 on which two opposing pulley halves 16, 18 are mounted for axial movement thereon. Each pulley half has an inner conical wall 20 to define with the opposing pulley half, a pulley (designated 22I on the input shaft and 22O on the output shaft) to receive an endless flexible drive member or band. One well-known flexible drive band is a chain 24 with laterally extending tabs 26 to engage radial grooves 28 in the pulley walls 20.

The ratio of speed between the input shaft and the output shaft is a function of the ratio of the effective diameter of one pulley to the other. In the conical pulleys 22I or 22O the effective diameters of the pulleys are determined by the distance between pulley halves on each of the transverse shafts 12, 14. Thus, to selectively change the speed ratio between the two drive shafts it is necessary to axially shift the pulley halves of one pulley together and/or shift the pulley halves of the other pulley apart. For this purpose, it is customary to provide spaced apart control bars 30, 32, each pivotal about a pivot pin 34 (on axes B and C) extending from a fulcrum block 36. A transverse control shaft 38 has blocks 40 with upstanding rollers 42 received between the spaced fingers 44 on the ends of bars 30, 32. Blocks 40 are in threaded engagement with control shaft 38, which has threads of opposite hand on opposite ends, so that rotation of control shaft 38 in one direction moves blocks 40 together, while rotation of the control shaft in the opposite direction moves blocks 40 apart.

Each of the pulley halves 16, 18 have hubs 46 which are pinned, as at 48, to the control bars 30, 32. The fulcrum blocks 36 are mounted on a transverse band tensioning shaft 50 which lies parallel to, and between, the input and output shafts. Thus, when the control shaft 38 is rotated in one direction or the other (by handwheel 52) the halves of one of the pulleys will draw together (to expand the diameter of the pulley) and the halves of the other pulley will draw apart (to diminish the diameter of the other pulley).

It has heretofore been recognized that reduction of the span between the control bar fulcrum axes B and C is desirable as the endless drive chain 24 wears to maintain the chain at optimum tautness on the variable diameter pulleys 22I and 22O. For this purpose, it is known, as shown in U.S. Pat. Nos. 3,097,540; 3,136,169; 3,138,033; 3,190,136; 3,349,633; 3,750,487; and 3,916,705 to automatically move the fulcrum points together as the chain wears. By way of example, U.S. Pat. No. 3,916,705 shows the use of an adjusting gear wheel rotatably mounted in coaxial relation to a tensioning shaft, and a coil spring connected between the gear wheel and the tensioning shaft, to rotate the adjustment shaft as the chain wears to maintain the chain taut.

As shown best in FIG. 1, the adjustment shaft 50 has threads 52 of one hand on one half and threads 54 of the opposite hand on the opposite half. The shaft, or screw, 50 has a reduced end 56 to form a shoulder 58 (see FIG. 1) where end 56 joins the rest of the shaft. A backup plate 60 is loosely received on the shaft end 56 between shoulder 58 and an arbor 62. The arbor 62 is secured on the shaft by pin 70.

One end 66 of a coil spring 68 is secured, by pin 70, to a flat 72 on one side of arbor 62. The other end 74 of the coil spring 68 is secured, by pin 76 to a gear wheel 78 which has worm teeth 78a on its periphery. The worm wheel 78 is loosely received on shaft end 56 for rotation thereon when unrestrained. The pin 76 connects worm wheel 78 to backup plate 60 so that the worm wheel and plate can turn in unison with respect to shaft 50. The worm wheel and plate serve to confine the coil spring therebetween.

As shown best in FIGS. 4A and 4B, there is provided herein improved mechanism to anchor the end of the coil spring which is remote from the tensioning shaft.

A locking member in the form of a sleeve, or cylinder 80, having an enlarged, threaded head 82, is received on axis M (which is parallel to an axis N defining a tangent to wheel 78) in a bore 84 in housing 10, the bore having an enlarged threaded span 86 to threadedly engage the head 82 of the locking sleeve 80. A shaft 88 in axis M has an upper end slidably and rotatably received inside the locking sleeve 80, and has a lower end journaled in and supported by the housing 10. An elongated gear in the form of worm 90 secured to the shaft 88 between said ends is continuously engaged with worm wheel 78. The worm and worm shaft constitute a worm unit which, although the worm is continuously engaged with the peripheral teeth 78a on worm wheel 78, shifts axially in one direction or the other (with the simultaneous rotation of the worm wheel) between limiting positions where the lower shoulder of the worm engages stop surface 10a (the wheel rotating position) and where the upper shoulder of the worm engages the lower end of the locking sleeve 80 (the locking position). In the locking position, the worm unit is held against rotation; in the wheel rotating position, the worm unit is disengaged from the locking member and rotatable to rotate the worm wheel.

The locking sleeve 80 terminates at its lower end in a tapered locking wedge, or shoulder, 92 which is engaged by the upper wedge shaped cavity 94 in a hub 96 of the worm 90 to lock the worm against further upward movement or rotation. When the worm 90 is so locked, the worm wheel 78 is held against rotation by the worm.

The worm 90 is continuously engaged with the worm wheel 78, and, during normal operation of the automatic chain tensioning device, the spring 68, acting through the positioning worm wheel 78, urges the worm 90 into locking engagement with the sleeve 80, as shown in FIG. 4B. Thus, the worm wheel 78 is locked, and the wound spiral spring 68 is exerting a force on the adjustment, or tensioning, screw 50 tending to turn the screw in the direction of arrow D (counterclockwise when viewed from the worm wheel end of shaft 50 as viewed in FIG. 4B). Rotation in the direction of arrow D tends to move the fulcrum blocks 36 together, thereby urging the separate halves of each pulley 22I and 22O together. The closing of both pulleys simultaneously expands both pulley diameters and tightens the chain 24 thereon. Thus, as the chain wears, the spiral spring maintains the tautness of the chain 24.

Although, normally, the initial setting of the spring would be sufficient to maintain the chain taut throughout its useful life, it should be noted that the spring can be easily rewound without rotation of the adjustment shaft and without disassembly of the housing. This is possible by virtue of the fact that the sleeve 80 extends through the wall 10d of the housing 10 and has an opening 98 in the head thereof, and by virtue of a slot 100 in the upper end of the worm shaft 88. A screwdriver S can be easily inserted through the locking cylinder into engagement with the worm shaft to depress the worm unit out of engagement with the locking sleeve 80, as shown in FIG. 4A. With the worm unit disengaged from the locking member, the worm unit can be rotated with the screwdriver to rotate the worm wheel. This rotation of the worm wheel will wind the spring 68 without disturbing the shaft 50 so that the fulcrum blocks are maintained in their current position.

As indicated, the adjustment screw is rotated in the direction of arrow D as the chain wears by virtue of the torque applied thereto by the spiral spring 68. A bevel gear 102 is mounted on the end of screw 50 (opposite the end on which the worm wheel 78 is mounted). The gear 102 is engaged, during normal operation, with a bevel gear 104 mounted on the lower end of a vertical indicator shaft 106. A pinion 108 at the upper end of the indicator shaft engages with a rack 110 slidably received in a slot 112 in the reducer housing 10. The bevel gear 104, shaft 106, and pinion 108 define a drive gear train T and the rack 110 defines a band life indicator.

When the chain is initially installed, the pinion 108 is engaged with one end of the rack 110. The bevel gear 104, the indicator shaft 106, and the pinion 108 (which constitute a gear, or drive, train) are rotated in a clockwise direction, when viewed from above, as indicated by arrow E. Thus, as the chain wears, the rack (which is colored red) is shifted to the right, as viewed in FIG. 5, and as indicated by arrow F. A window 114 of glass or other transparent material is locked over the right side only of the slot 112 so as wear of the chain progresses, the red rack fills progressively more of the window. When the window is filled with the red rack the chain should be replaced.

To replace the chain, the locking sleeve 80 must be backed off so that the worm 90 can disengage from the worm wheel 78. The cover (not shown) of the housing must be removed so that the screw 50 can be rotated by manual rotation of a nut 113 in the direction of arrow G. Thus the fulcrum blocks 36 (and hence the pulley halves) are moved apart to facilitate removal of the worm chain and installation of a new chain. After the new chain is placed over the pulleys, the nut 113, which is pinned to screw 50, is manually rotated in the direction of arrow H until the chain is at the proper tautness. Thereafter, the locking sleeve 80 is returned to its normal position shown in FIGS. 4A and 4B, and the worm 90 is depressed and turned by a screwdriver S received in shaft slot 100 to tighten the chain. The vertical indicator shaft 106, which is received in a bore 116 in a portion of the housing and is urged downwardly by spring 118, is raised against the force of the spring 118 to disengage the pinion 108 from the rack. The rack is then moved to its extreme left position in the slot, out of view from the window, and the indicator shaft 106 is released to reengage the spur gear with rack.

A modified form of the invention is shown in FIG. 6. In this modification the worm unit comprising worm 90 and worm shaft 88 is similar to the worm unit previously described. The locking sleeve, however, has been replaced with a locking ring R which is attached (as by welding) to a portion 10b of the housing. The ring R has locking teeth T which engage with the locking teeth (defined by wedge cavities 94) of the worm unit. The opposite ends of the worm shaft of the worm unit are slidably received, respectively, in housing portions 10b and 10c for movement between the limiting positions with the worm against web 10c (for rotation of worm wheel 78) and with the worm locked with ring R (to lock worm wheel 78). As in the previously described embodiment, the worm unit is normally biased by spring 68 (acting through worm wheel 78) into locking engagement with the locking member (ring R) as shown in FIG. 6. As described in conjunction with FIG. 4A, the worm unit 88, 90 of this embodiment is also disengaged from the locking member R by a screwdriver (not shown).

Although the best mode contemplated for carrying out the present invention has been herein shown and described, it will be apparent that modification and variation may be made without departing from what is regarded to be the subject matter of the invention.

What is claimed is:

1. In a transmission band tensioning mechanism having a band tensioning shaft and having an adjusting wheel mounted coaxially with said shaft and rotatable relative thereto, said tensioning mechanism having a spring connected between the adjusting wheel and the shaft, the improvement comprising a locking member adjacent the adjusting wheel, a gear engaged with the adjusting wheel and normally urged by the spring acting through the adjusting wheel into engagement with the locking member to be held against rotation, said gear shiftable out of engagement with the locking member while maintaining engagement with the adjusting wheel and rotatable for rotation of the adjusting wheel and tightening of the spring.

2. In a transmission band tensioning mechanism having a band tensioning shaft and having an adjusting wheel mounted coaxially with said shaft and rotatable relative thereto, said tensioning mechanism having a spring connected between the adjusting wheel and the shaft, the improvement comprising a locking member adjacent the adjusting wheel, a worm engaged with the adjusting wheel and normally urged by the spring acting through the adjusting wheel into engagement with the locking member to hold the worm against rotation, said worm shiftable out of engagement with the locking member for rotation of the adjusting wheel and tightening of the spring.

3. In a transmission band tensioning mechanism having a band tensioning shaft and having an adjusting wheel mounted coaxially with said shaft, said tensioning mechanism having a spring connected between the adjusting wheel and the shaft, the improvement comprising a locking member adjacent the adjusting wheel and extending through the locking member, an axially shiftable worm unit engaged with the adjusting wheel and normally urged by the spring acting through the adjusting wheel into engagement with the locking member to hold the worm against rotation, said worm shiftable out of engagement with the locking member for rotation of the adjusting wheel and tightening of the spring.

4. In a transmission band transioning mechanism having a band tensioning shaft and having an adjusting worm wheel mounted coaxially with said shaft and rotatable relative thereto, said tensioning mechanism having a coil spring connected between the adjusting wheel and the shaft, a locking member mounted on an axis parallel to a tangent to the adjusting wheel, a worm unit including a worm engaged with the periphery of the adjusting worm wheel and including a worm shaft on said axis, said worm unit shiftable on said axis between a locking position in engagement with the locking member and a wheel rotating position, said worm unit held against rotation when engaged with said locking member and disengaged from said locking member for rotation when in said wheel rotating position.

5. In a transmission band tensioning mechanism having a band tensioning shaft and having an adjusting wheel mounted on the shaft, said tensioning mechanism having a spring connected between the adjusting wheel and the shaft; the improvement comprising a locking sleeve mounted adjacent the adjusting wheel, a worm engaged with the adjusting wheel to rotate the adjusting wheel and tighten the spring on rotation of the worm, a worm shaft to support the worm, said worm shaft slidably received in the locking sleeve, said worm and worm shaft being urged into locking engagement with said locking sleeve by the spring acting through the worm wheel to prevent rotation of the adjusting wheel, said worm shaft and worm shiftable out of locking engagement with the locking sleeve for rotation of the worm and tightening of the spring between the adjusting wheel and the band tensioning shaft.

6. In a transmission band tensioning, mechanism mounted in a transmission housing, said mechanism having a band tensioning shaft and having an adjusting wheel rotatably mounted on the shaft, said tensioning mechanism having a coil spring surrounding said shaft, said spring connected at one end to said adjusting wheel and connected at the opposite end to said shaft, the improvement comprising a locking sleeve mounted in the housing adjacent said adjusting wheel, said locking sleeve having locking teeth at one end, a worm engaged with the adjusting wheel to rotate the adjusting wheel and tighten the spring on rotation of the worm, the worm shaft slidably and rotatably received in said locking sleeve, said worm shaft supporting the worm outside the locking sleeve, said worm and worm shaft forming a worm unit and having locking teeth thereon in facing relation to the locking teeth on the locking sleeve, said worm unit normally urged into locking engagement with the locking sleeve to hold the worm and adjusting wheel from rotation, said worm unit depressible against the bias of said spring out of engagement with the locking sleeve for rotation of the worm and adjusting wheel to tighten the tension spring.

* * * * *